United States Patent [19]

Schafer et al.

[11] 3,729,182
[45] Apr. 24, 1973

[54] PROCESS AND APPARATUS FOR RECOVERING PRECIOUS METALS

[75] Inventors: Jack R. Schafer, Wickensburg, Ariz.; Denton C. Linton, Salt Lake City, Utah

[73] Assignee: Desert West, Inc., Salt Lake City, Utah

[22] Filed: Nov. 19, 1970

[21] Appl. No.: 91,082

[52] U.S. Cl. ..........................266/9, 75/109, 75/118, 209/48, 209/62
[51] Int. Cl. ...........................................C22b 11/12
[58] Field of Search..........................266/9, 12, 22; 75/97 R, 109, 118, 121; 209/41, 46, 48, 50–56, 59, 60, 62, 65, 70, 174–179

[56] References Cited

UNITED STATES PATENTS 458,823    9/1891    Cook.................................209/62

Primary Examiner—Gerald A. Dost
Attorney—B. Deon Criddle

[57] ABSTRACT

A process of extracting gold, silver, platinum, mercury and other precious metals from ores containing the metals using mercury amalgams but without mercury losses due to flowering, galvanic action, oxidation, etc. Ores containing the metals to be recovered are contacted with mercury in an electrically isolated condition. A preferred apparatus useful in performing the process includes a mixing drum having a feed system and a discharge system isolated from ground and insulating wheels for driving the mixing drum.

6 Claims, 4 Drawing Figures

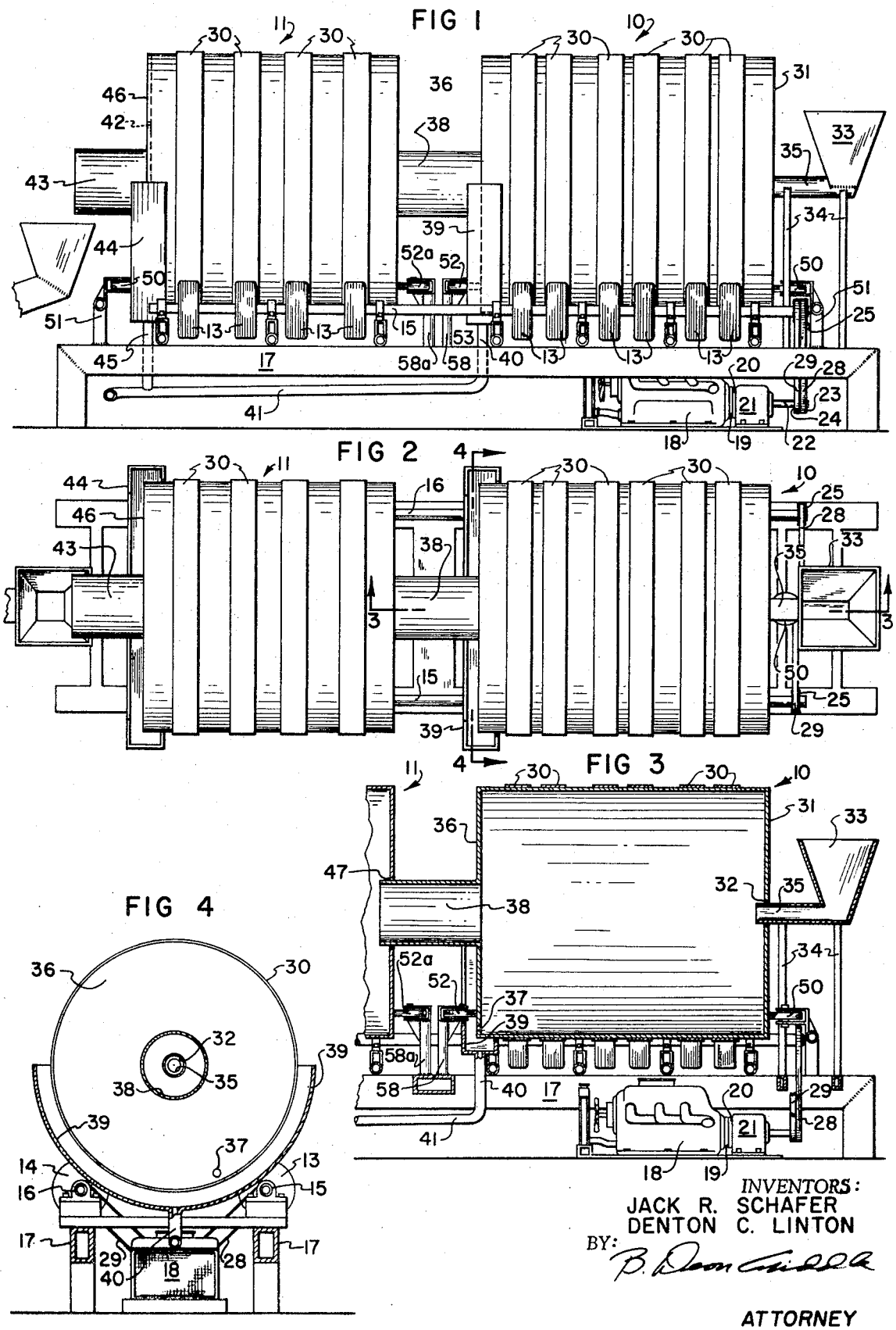

PROCESS AND APPARATUS FOR RECOVERING PRECIOUS METALS

BRIEF DESCRIPTION OF THE INVENTION

1. Field of the Invention

This invention relates to processes for mercury amalgamation of ores containing precious metals and to apparatus for performing such methods. It is specifically related to such processes for the recovery of gold, silver, etc. and to the prevention of mercury losses normally incident to mercury amalgamation of such ores.

2. Prior Art

It has long been recognized that mercury can be used to recover precious metals from ores. However, the processes heretofore known have involved extensive losses of the mercury used for amalgamation purposes and because of the costs involved in replacing the mercury there has been a loss of profits that could otherwise have been enjoyed. In spite of all that has been done in the mercury amalgamation of ores, it appears that the importance of electrically isolating the amalgam during the process has not been recognized. Thus, in U.S. Pat. No. 548,150 a process is disclosed wherein an extractor is electrically isolated from ground, as a means of preventing shock injury to users, but wherein the amalgam is deliberately subjected to electrolytic treatment, with the mercury forming one electrical terminal of the electrolysis cell.

SUMMARY OF THE INVENTION

It is an object of the present invention to provide a method and an apparatus for recovering precious metals, such as gold and silver from ores containing these metals through mercury amalgamation, but without the mercury losses usually attendant to such processing.

Principal features of the invention include the mixing of mercury with the ore being treated, together with such other reactants and catalysts as may be necessary to the process, in a condition that is totally electrically isolated, even from ground.

In a preferred apparatus for practicing the method a pair of aligned mixing drums are arranged to be powered by pneumatic rubber wheels and ore is fed into and metals and waste materials are discharged from the drums through air gaps, whereby isolation is maintained even though continuous processing may occur.

Ore and mercury are fed into inlet ends of the drums along the center axis thereof and amalgamated ore is collected at peripheries of opposite discharge ends. Tailings are then discharged through the discharge ends and axially of the drums.

The speed of rotation of the drums is easily regulated by the supporting and turning wheels, and pneumatic, non-conductive rollers engage the ends of the drums to prevent axial travel of the drums off of the wheels.

Any conventional mixing structure can be used inside the drum to insure thorough mixing of the mercury and the ore. Thus, in the drums shown, conventional steel ball, not shown, are used. Rocks could also be employed in similar fashion and baffles, or other such structure could as well be used.

Additional objects and features will become apparent to those skilled in the art from the following detailed description and drawings, disclosing what is presently contemplated as being the best mode of the apparatus of the invention.

THE DRAWINGS

In the drawings:

FIG. 1 is a side elevation view of a preferred embodiment of the apparatus of the invention;

FIG. 2, a top plan view;

FIG. 3, a fragmentary vertical section, taken on the line 3—3 of FIG. 2; and

FIG. 4, a vertical section, taken on the line 4—4 of FIG. 2.

DETAILED DESCRIPTION

Referring now to the drawings:

In the illustrated preferred embodiment of the apparatus of the invention, a pair of drums 10 and 11 are shown in end to end, in axially aligned relationship.

The drums are each supported on a series of pneumatic, rubber tired wheels 13 and 14 at opposite sides of the drums, and the wheels at opposite sides are respectively mounted on axles 15 and 16.

A frame 17 journals the axles 15 and 16 and surrounds a motor 18. As shown, motor 18 is gasoline powered, but it should be apparent that an electric motor could as well be used. The output shaft 19 of the motor is connected to the input shaft 20 of a suitable gear box 21, the output shaft 22 of which has pulleys 23 and 24 thereon. V-belts 28 and 29 then respectively connect the pulleys 23 and 24 with pulleys 25 secured to axles 15 and 16. Thus, operation of the motor 18 to turn shaft 19 will rotate the axles 15 and 16 and the wheels 13 and 14 mounted thereon.

The wheels frictionally engage wear bands 30 that extend around the drums and that are preferably bands of steel having sufficient width to be readily engaged by the wheels. If necessary, the bands can be made with a rough surface to increase the frictional engagement, but this is generally not necessary and rotation of the wheels will normally rotate the drums.

The inlet end of drum 10 is closed by a plate 31 except for an opening 32 in the center of the plate that is aligned with the axis of the drum.

A hopper 33, supported by a frame 34 is arranged such that its discharge chute 35 extends into opening 32, without touching the plate 31. Ore and liquid dumped into the hopper can be discharged through chute 35 into the drum, but no electrical contact is established from the drum to ground through the hopper or support frame 34.

A plate 36 closes the discharge end of drum 10, except for an opening 37 a spaced distance in from the periphery of the drum and a central discharge opening surrounded by a duct 38. A semi-circular trough 39 extends a spaced distance beneath the discharge end of drum 10 to receive material falling out through the opening 37. A spout 40 at the lowest part of trough 39 then discharges the collected material to a conduit 41 that carries the discharged material to a collection or processing location, not shown. The material discharged through opening 37 is a mixture of ore, water and an amalgamation of mercury and the precious metals contained in the ore. The tailings, after amalgamation, are normally discharged through duct 38 into drum 11. The duct 38 is also arranged to feed into a central opening 47 in the inlet end plate 40 of drum 11, without actually touching the plate.

At its other end, drum 11 has a plate 46 corresponding to the plate 36 of drum 10, with a peripheral opening 42 and a central discharge passage surrounded by a discharge conduit 43. Another semi-circular trough 44, is positioned beneath the lower discharge end of drum 11 to receive material discharged through opening 42, and a spout 45 at the lowermost portion of trough 44 drains the material to the collector conduit 41.

Rubber-tired rollers 50 are mounted on supports 51 extending upwardly from frame 17 and are arranged such that the rollers engage the plate 31 on the inlet end of drum 10 and the plate 41 on the discharge end of drum 11. Other rollers 52 and 52a, of similar construction, are similarly mounted on supports 58 and 58a extending upwardly between the drums and are respectively arranged to engage the plate 36 on the discharge end of drum 10 and a plate 53 on the inlet end of drum 11. The rollers 50 and 51 thus prevent axial movement of the drums on the wheels 13 and 14.

In operation, motor 18 is operated to drive wheels 13 and 14 and to thereby rotate the drums 10 and 11. Ore to be processed, mercury, water and such conventional extraction materials as may be used are all fed into drum 10 where the mercury and the ore is agitated together. The precious metals in the ore are coated with the mercury and move to the outside of the drum and ultimately out of the drum through opening 37. The remaining ore and mercury is moved as a slurry out of drum 10, through duct 38 and into drum 11. The process is repeated in drum 11 and additional amounts of ore and mercury amalgam are discharged from drum 11, through the opening 42. The remaining ore is discharged as tailings through duct 43. The precious metals are collected in troughs 39 and 44 and are dropped into the collector conduit 41 that moves them, by gravity, to a processing area. Conventional separation methods are used to separate the metals from the mercury and any ore discharged with them.

Throughout the entire process the amalgamation occurs in an area that is completely electrically isolated from ground. It has been found that this isolation is necessary to prevent flowering, galvanic action, oxidation, and other conditions common to mercury amalgamation of ores. As a result, great savings are realized in the amount of mercury required to process the ores.

While a particular isolating apparatus has been disclosed, and this apparatus is preferred for many purposes, other isolating structure can be used to practice the method of the invention. For example, a rotating drum can be used having a non-conductive liner of rubber or other suitable and durable material can be used.

Although a preferred form of my invention has been herein disclosed, it is to be understood that the present disclosure is by way of example and that variations are possible, without departing from the subject matter coming within the scope of the following claims, which subject matter I regard as my invention.

I claim:

1. Apparatus for recovering precious metals comprising
    at least one mixing drum;
    means for feeding ore to be processed, water and mercury into each said drum, said means being electrically isolated from each said drum;
    drive means for rotating each said drum;
    coupling means interconnecting said drive means and material in each said drum, said coupling means electrically isolating said drive means from each said drum;
    amalgam collection means;
    amalgam discharge means from each said drum, said amalgam discharge means being electrically isolated from the said amalgam collection means and arranged to discharge mercury amalgams from the inside of each said drum to the said amalgam collection means;
    tailings discharge means; and
    tailings collection means electrically isolated from the tailings discharge means and adapted to receive material discharged through the tailings discharge means from the inside of each said drum.

2. Apparatus as in claim 1, wherein the drum is driven by said drive means whereby it rotates about a central and and wherein the means for feeding ore to be processed, water an and into into the drum comprises a chute extending through a wall the drum, aneinto the spaced drum along the axis of rotation of thedrum, said chute being sapced from the wall of the drum through which it extends.

3. Apparatus as in claim 2, wherein the amalgam discharge means comprises an opening through the drum at a peripheral edge thereof and at a level commensurate with the mercury placed in the tank as the tank is rotated, and the amalgam collection means includes a trough spaced from the drum and at all times beneath the opening.

4. Apparatus as in claim 3, wherein the tailings discharge means comprises an opening at the axis of rotation of the drum and means spaced from the opening and the drum to catch material discharged through the opening.

5. Apparatus as in claim 4, wherein the coupling means interconnecting the drive means and material in the drum, comprises wheels supporting the drum and driven by said drive means, whereby the said drum is rotated about its axis, said wheels being made of electricity insulating material.

6. Apparatus as in claim 1, wherein at least two axially aligned mixing drums are provided and the second drum receives tailings discharged from the first drum.

* * * * *